United States Patent
Janosky et al.

[19]

[11] Patent Number: 6,037,735
[45] Date of Patent: Mar. 14, 2000

[54] SLOW-SPEED SERVOMECHANISM

[75] Inventors: Mark S. Janosky, Rochester; Kenneth A. Lindsay, Brockport, both of N.Y.

[73] Assignee: Eastman Kodak Company, Rochester, N.Y.

[21] Appl. No.: 09/260,615

[22] Filed: Mar. 1, 1999

[51] Int. Cl.[7] .................................................. G05B 11/18

[52] U.S. Cl. ........................ 318/608; 318/603; 318/592; 318/625; 318/696

[58] Field of Search ..................................... 318/560–696, 318/799; 360/77.11, 77.03, 78.06; 346/75; 388/812, 813; 395/21; 340/347 P

[56] References Cited

U.S. PATENT DOCUMENTS

| | | |
|---|---|---|
| 4,072,884 | 2/1978 | Treadwell . |
| 4,546,299 | 10/1985 | Veale . |
| 4,623,831 | 11/1986 | Sakamoto et al. ...................... 318/799 |
| 4,647,827 | 3/1987 | Toyoda et al. .......................... 318/592 |
| 4,701,839 | 10/1987 | MCNally et al. . |
| 4,906,909 | 3/1990 | Gremillion et al. . |
| 4,954,905 | 9/1990 | Wakabashi et al. .................. 360/77.03 |
| 4,962,331 | 10/1990 | Smith . |
| 4,999,558 | 3/1991 | Onodera et al. ........................ 318/685 |
| 5,005,089 | 4/1991 | Thanos et al. ....................... 360/77.08 |
| 5,072,179 | 12/1991 | Miller et al. . |
| 5,384,527 | 1/1995 | Rozman et al. .......................... 322/10 |
| 5,416,397 | 5/1995 | Mazzara et al. ........................ 318/696 |
| 5,493,200 | 2/1996 | Rozman et al. .......................... 322/10 |
| 5,642,461 | 6/1997 | Lewis ....................................... 388/812 |
| 5,854,877 | 12/1998 | Lewis ....................................... 388/812 |

OTHER PUBLICATIONS

Hathaway Motion Control Internet Article, *Computer Optical Products, Inc.,* Chatsworth, California, 1996, pp. 1–6.

R. M. Setbacken, "Applications of Rotary Optical Encoders and Resolvers in Brushless Servo Motors", *RENCO Encoders,* pp. 1–12. No Date.

*Primary Examiner*—Paul Ip
*Attorney, Agent, or Firm*—Thomas H. Close

[57] ABSTRACT

A slow-speed servomechanism includes a motor for driving a load; a direct drive transmission between the motor and the load; an incremental optical encoder connected to the load, the encoder having analog sine and cosine outputs; an analog to digital converter for converting the sine and cosine analog values to digital values; and a digital controller, connected to the motor and the analog to digital converter, for controlling the motor. The digital controller includes an angle decoder responsive to the sine and cosine digital values from the analog to digital converter to produce a relative position count indicating a position within one sine and cosine signal pair, a cycle counter responsive to the relative position count for producing an absolute position count within the operating range of the servomechanism by determining which sine cosine pair is being measured, the angle decoder and cycle counter performing at least four angle decodes within each encoder sine and cosine cycle; a command generator responsive to a user defined desired motion of the load to output a desired count; a phase detector responsive to the absolute position count from the cycle counter and the desired count from the command generator to produce an error signal, and a compensation filter responsive to the error signal for generating a motor driving command.

11 Claims, 2 Drawing Sheets

SLOW-SPEED SERVOMECHANISM

FIELD OF THE INVENTION

The present invention relates to a servomechanism for controlling the speed of a motor, and in particular to such a servomechanism that is adapted to control slow-speed motion.

BACKGROUND OF THE INVENTION

Slow-speed motion control (<15 RPM rotational and <1.0 IPS linear) is required for many web transport applications such as coating, printing and scanning. In many cases, the application is sensitive to deviations from a nominal operating velocity. These undesirable velocity changes are often referred to by names such as flutter, jitter and wow. The traditional approach to minimizing these fluctuations is to utilize a servomechanism as the motion control system. These servomechanisms utilize closed loop control methods in conjunction with components including controllers, amplifiers, motors, transmissions and feedback sensors. A state-of-the-art servomechanism block diagram is illustrated in FIG. 1. It shows the typical interconnection relationship between the major components.

The basic theory of operation of these servomechanisms is to use a digital controller 10 (usually a digital microcontroller, microprocessor or digital signal processor) to control the motion of a load 26. The digital controller 10 includes a command generator 12 that produces a command signal. The command signal is in the form of a digital count that relates to the rotational or translational position of the load 26. The digital controller 10 uses a phase detector 14 to compare the command signal to a feedback count that comes from a digitizing device 30. This comparison is usually a simple subtraction that produces an error count. This error count is then filtered with a compensation filter 16 (usually some type of lead-lag or proportional-integral-derivative (PID) compensation algorithm) which is required to stabilize and enhance the performance of the overall control loop. The output of the compensation filter 16 is then converted into the analog control voltage in a digital-to-analog converter (DAC) 18 which produces a voltage control signal. This voltage signal drives the motor amplifier 20/motor 22 combination so that the motor 22 can deliver a force or torque to a given load 26. The delivery of this force or load is usually done by means of a transmission 24.

The load 26 then rotates or translates as a result of the applied torque or force. A feedback sensor 28 senses this output rotation or translation of the load 26. Usually, this feedback sensor 28 is an incremental optical encoder. Basically, the incremental optical encoder 28 outputs a pair of square waves voltage signals that are out of phase by 90 degrees. This pair of square waves is normally referred to as quadrature signals due to the fact that they can be measured so as to effectively increase the resolution of the incremental optical encoder by a factor of 4×. Whether the servomechanism is measuring only one of the square waves for 1× resolution or both square waves for 4× resolution, a digitizing device 30 such as an up-down-counter is used to count the rising and falling edges. The result of this counting is the feedback count that is fed back into the controller so that it can be used by the phase detector 14 to produce the error count.

The sequence of operations happens in real time and can be optimized by varying many of the parameter values that exists within the overall system. This control technique is sometimes referred to as quadrature control (if the feedback sensor is an incremental optical encoder) due to the counting technique used in converting the signal from feedback sensor 28 to an appropriate feedback signal for the digital controller 10.

Within this control scheme, each individual component has critical functions and thus must be designed with care. One component that can cause a number of problems if not carefully designed is the transmission 24. There are two primary advantages for using a transmission 24 in a slow-speed application. First, most available servomechanisms are designed for medium (15 RPM to 1000 RPM) or high-speed (>1000 RPM) applications. Therefore, the transmission 24 can provide a means of speed reduction through the effective "gear ratio" of the transmission 24. This speed reduction can be mathematically described by:

$$V_{out}=V_{in}/n \qquad (1)$$

where: $V_{out}$=velocity of load
$V_{in}$=velocity of motor
n=effective "gear ratio" of transmission 18 (usually >1).

Second, the transmission 24 provides a means of amplifying the force or torque produced by the motor 22. Therefore, for a given load 26, a smaller motor 22 can be used. This, in turn results in less power consumption by the overall servomechanism. From a mathematical sense the amplification can be described by:

$$T_{out}=T_{in}*n \qquad (2)$$

where: $T_{out}$=torque or force outputted by transmission 24
$T_{in}$=torque produced by motor
n=effective "gear ratio" of transmission 24 (usually >1).

These advantages make transmissions 24 very useful in many applications.

However, transmissions 24 also have disadvantages mainly due to the fact that the designer is adding another component to an already complex design. These disadvantages can be stated more distinctly as follows.

The transmission 24 itself has a finite size that reduces some of the advantage of a smaller motor 22.

Mechanical errors are introduced into the servomechanism by the transmission 24.

In most cases, the advantages of having a transmission 24 outweigh the disadvantages. However, in the applications where a system is very sensitive to velocity fluctuations, the mechanical errors in the transmission 24 can cause major problems in meeting design requirements. In fact, a major part of the design and development effort can be spent in an attempt to minimize the transmission-induced errors.

Therefore, it would be advantageous to build a servomechanism that did not require a transmission 24. Such a system is referred to as a direct drive servo. The traditional approach in designing a direct drive servo system employs the same components found in FIG. 1, minus the transmission 24. The problem that arises in a slow-speed application using a direct drive transmission 24 is that the feedback sensor 28 in conjunction with the digital controller 10 must meet a Nyquist data-sampling requirement. That is, the servomechanism must sample enough different angles in a given period of time (the sample rate of the servomechanism usually referred to as the Control Loop Sample Time) from the feedback sensor 28 to provide smooth operation of the servomechanism. This is one of the main reasons for using the quadrature signals out of an incremental encoder 28 since it offers an immediate 4× increase. In fact, numerous electronic schemes have been employed to further increase this resolution by electrical means. Unfortunately, these means are all only as good as the precision and accuracy of the original rising and falling edge relationships. The other disadvantages of these types of resolution increase methods are that they are complex and therefore add cost.

Therefore, motion control designers have attempted to use analog signal feedback sensors 28 that have an effective resolution of infinity. One way to accomplish this is to employ an optical encoder 28 that produces sine and cosine output signals. In the use of an incremental optical encoder 28, the designer has a device that has a base resolution. However, by interpolating the sine and cosine signals, the designer can approach a resolution of infinity.

Published articles on the Internet by Hathaway Motion Control, Hewlett-Packard (West (1994)), and Renco Encoders (Setbacken (1998)) discuss several methods of using sine and cosine waves to provide position and slow-speed motion control. In general, the methods employ the digital controller 10 to interpolate the sine and cosine to effectively increase the overall resolution of the incremental optical encoder 28, and employ some form of cycle counting to prevent runaway. For example if an incremental optical encoder 28 has 1000 cycles per revolution and the motion controller divides each cycle up into 500 divisions, the effective resolution is 500,000. Again, this fidelity is what gives the design the capability of running at slow-speeds since it can meet a sampled data Nyquist requirement.

The methods used to perform this interpolation or angle decoding are numerous. For example, Setbacken describes the use of the trigonometric relationship: $\sin(a+b)=\cos(a)\sin(p)+\sin(a)\cos(p)$. In this case, the base sinusoidal signals $\sin(a)$ and $\cos(a)$ are multiplied by phase shifted copies. See the article published on the Internet by Robert M. Setbacken. In the West article, a position control approach is used in which the actual crossover of sine and cosine waves (exactly the same as keeping track of the rising and falling edges of a quadrature encoder) is performed as a coarse measurement. The digital controller 10 then performs a fine interpolation using look-up-table or algorithm based on an arctangent function. The result is the ability to position at higher resolutions than the base resolution of the encoder 28.

These techniques work fine for high-resolution position control but still have a problem with smooth slow-speed control. Basically this is due to their method of controlling motor runaway. A motion control system is subject to noise, both mechanical and electrical. One of the main reasons for using a feedback sensor 28 is to take advantage of the fact that once a servomechanism is operating, it tries to fight these noise sources by filtering them out so that the control of the motion is maintained. If however, these disturbances are large, the digital controller 10 can lose track of which sine and cosine cycle is being measured (in the case of an incremental optical encoder, the encoder does not output an absolute position, the digital controller 10 determines the absolute position). If the controller 10 loses track of the cycle, it will produce an error signal that after being processed will cause the motor 22 to move the load 26 with a high-speed in one direction or the other. The result is loss of all control and a motor runaway condition. To control this phenomenon, the prior art systems have employed some form of cycle counting that is similar to the quadrature method discussed above as a coarse control on motor position. Determining the coarse and fine angles separately causes phase errors that lead to noise when the servo is used to control velocity. Because of the resulting noise, slow-speed control is still subject to unacceptable velocity fluctuations.

There is a need therefore for a servomechanism, using an incremental optical encoder having a sine and cosine output that can control the phenomenon of runaway, and which also has improved a slow-speed operation.

SUMMARY OF THE INVENTION

The need is met according to the present invention by providing a servomechanism including a motor for driving a load; a direct drive transmission between the motor and the load; an incremental optical encoder connected to the load, the encoder having analog sine and cosine outputs; an analog to digital converter for converting the sine and cosine analog values to digital values; and a digital controller, connected to the motor and the analog to digital converter, for controlling the motor. The digital controller includes an angle decoder responsive to the sine and cosine digital values from the analog to digital converter to produce a relative position count indicating a position within one sine and cosine signal pair, a cycle counter responsive to the relative position count for producing an absolute position count within the operating range of the servomechanism by determining which sine cosine pair is being measured, the angle decoder and cycle counter performing at least four angle decodes within each encoder sine and cosine cycle; a command generator responsive to a user defined desired motion of the load to output a desired count; a phase detector responsive to the absolute position count from the cycle counter and the desired count from the command generator to produce an error signal, and a compensation filter responsive to the error signal for generating a motor driving command.

According to a further aspect of the invention, a digitizing device connected to the output of the incremental optical encoder produces a quadrature output and a software switch is provided for selectively connecting the absolute position count or the quadrature output to the phase detector for operating the servomechanism in a slow-speed, or medium/high-speed mode, respectively.

ADVANTAGES

The servomechanism technique of the present invention provides a system that can be used for a wide range of motion control applications. It is primarily designed to provide smooth slow-speed control of a load, but it actually can provide speed control ranging from no speed up to the maximum capability of the motor/transmission/load/encoder combination. This is simply accomplished by using an incremental optical encoder that produces both quadrature and sine and cosine output signals. If slow-speed control is required, the servomechanism can be operated in a mode that uses the sine and cosine signals as the feedback of the load position. If medium to high-speed is required, the servomechanism can be operated in a mode that uses the quadrature signals as the primary feedback of the load position. More specifically, the following detailed advantages apply to this invention.

The servomechanism of the present invention allows bi-directional motion control to be achieved at all speeds ranging from 0 RPM up to the maximum capabilities of the motor and load combination.

In the slow-speed operation mode, smooth velocity control is achieved by using an angle decoder and cycle counter combination which effectively increases the overall resolution of the base incremental optical encoder by interpolating the sine and cosine signals generated by the encoder.

Optical encoders used with the present invention are widely available and are relatively inexpensive.

The servomechanism of the present invention offers highly accurate position control when operated in the slow-speed operation mode due to the effective high resolution from the angle decoder and cycle counter interpolation.

The resolution of this position control is limited by the number of sine and cosine cycles per revolution of the encoder and an internal controller gain referred to as the angle decoder gain. The encoder and analog-to-digital converter (ADC) specifications limit precision or accuracy of the positioning systems.

The elimination of a transmission simplifies the mechanical design that in turn allows higher performance to be achieved due to less mechanical tolerance errors and easier to control structural dynamics.

The present invention uses a fast angle decoder and cycle counter in order to prevent a motor runaway phenomenon from occurring thus allowing slow-speed control to be performed under conditions in which the servomechanism is experiencing disturbances.

DETAILED DESCRIPTION OF THE INVENTION

The servomechanism according to the present invention is a wide speed range servomechanism because it can run in two modes. The first mode is a slow-speed operation that can be used to perform high resolution positioning or the accurate slow-speed motion. This first mode uses sine and cosine waveform signals from the incremental optical encoder as the primary feedback of the load's position. The second mode is a medium to high-speed operation that can be used exactly as the name implies medium to control high-speed operation. This mode enhances the overall flexibility of the servomechanism design since many applications require rewind operations that do not require smoothness. This second mode uses quadrature signals that are produced by the incremental optical encoder.

Figure 1:
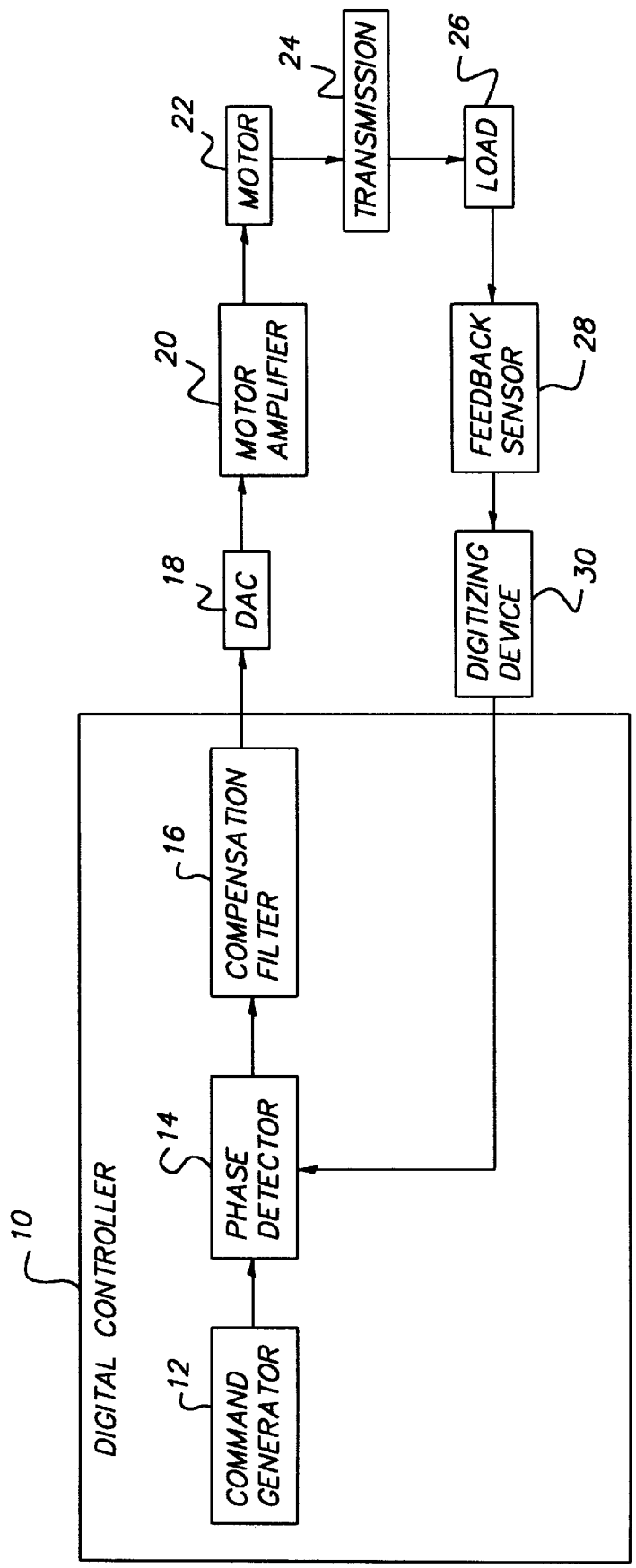
FIG. 1 is a schematic diagram of a typical prior art servomechanism.
Figure 2:
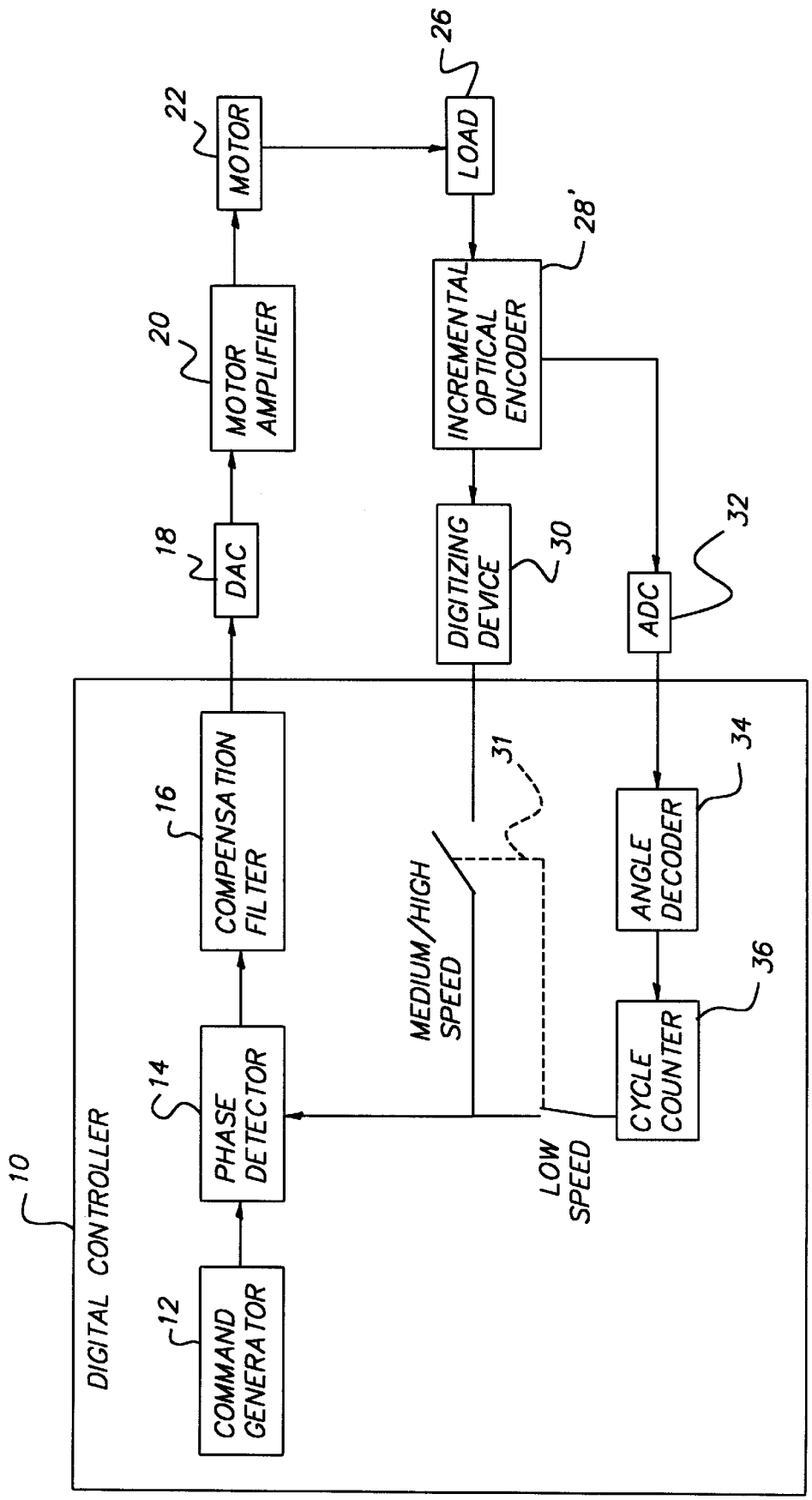
FIG. 2 is a schematic diagram of a general servomechanism according to the present invention.

Referring to FIG. 2, a controller according to the present invention will be described. A digital controller 10 controls the motion of a load 26. The digital controller 10 has a command generator 12 that produces a desired command signal. The command signal is in the form of a digital count that relates to the rotation or translation position of the load 26. The digital controller 10 uses a phase detector 14 to compare the command signal to a feedback count. This comparison is a simple subtraction that produces an error count. This error count is then filtered with a compensation filter 16 (either a lead/lag or a proportional-integral-derivative (PID) compensation) which is required to stabilize and enhance the performance of the overall control loop. The output of the compensation filter 16 is then converted into the analog control voltage in a digital-to-analog converter (DAC) 18 which produces a voltage control signal. This voltage signal drives the motor amplifier 20/motor 22 combination so that the motor 22 can deliver a force or torque to a given load 26. The delivery of this force or torque is usually done by means of a direct drive transmission 24.

The load 26 then rotates or translates as a result of the applied torque or force. A feedback sensor 28, an incremental optical encoder, senses this output rotation or translation of the load 26. The incremental optical encoder 28 produces voltage signals in the form of a quadrature set (two square waves with a 90 degree phase shift) and a sine and cosine wave pair.

If the servomechanism is operating in a slow-speed operation mode, the digital controller 10 is responsive to the sine and cosine signals that are digitized by an ADC 32. A combination angle decoder 34 and cycle counter 36 are responsive to the digitized signal from the ADC 32 and produce a digital count that represents a rotational angle or linear position. This digital count is the feedback count that is sent to the phase detector 14 for producing the error count that continues on and controls the load 26.

If the servomechanism is operating in a medium to high-speed operation mode, the digital controller 10 is responsive to the quadrature signal that are counted by a digitizing device 30, usually an up-down counter 30. The digital signal out of the up-down counter 30 is then representative of a rotational angle or linear position. This digital count is the feedback count that is sent to the phase detector 14 for producing the error count that continues on and controls the load 26. A switch 31 is provided for switching the servo between medium/high-speed operation and slow-speed operation.

The sequence of operations, both for slow-speed or medium to high-speed mode operations, happens in real time and can be optimized by varying many of the parameter values that exists within the overall system. While the medium to high-speed operation mode is basically a state-of the-art design, the slow-speed operation mode provides a mode that is useful for numerous applications.

The key to the slow-speed operation is to use the DSP digital controller 10 to perform the angle decode and cycle counter combination operations at a fast enough rate to prevent the servomechanism from experiencing motor runaway. Motor runaway is an instability phenomenon that occurs when the DSP digital controller 10 cannot convert the sine and cosine output signals into angles fast enough to meet the Nyquist criterion of a digital sample system. Specifically, the angle decoder and cycle counter must perform at least four angle decodes within one encoder sine and cosine cycle. If this criterion is met, the servomechanism will always know where it is and runaway instability will not occur.

Because of the limits imposed by the runaway instability phenomenon, the digital servomechanism according to the present invention has two sampling times or periods. These are the following:

Control Loop Sample Time

Angle Decode Sample Time.

The Control Loop Sample Time is the traditional digital sample period that stabilizes the real time process that takes place as the servomechanism is operating. The Angle Decode Sample Time is the sample time associated with preventing servomechanism runaway instability. Therefore, the challenge faced by the inventors was to provide a robust combination angle decoder 34 and cycle counter 36 algorithm that performs the functions that will prevent the motor runaway instability phenomenon.

The angle decoder algorithm according to the present invention is made robust by minimizing the Angle Decoder Sample Time. Two basic approaches are theoretically available for minimizing the Angle Decoder Sample Time. Relative to the angle decoder 34 they fall into one of the following two general categories:

Use a built in arctangent function and calculate angles during the actual operation of the servomechanism motion control.

Use the arctangent function to build a look-up-table prior to operating the servomechanism and then just address the look-up-table with the digitized values from the ADC to obtain an angle.

The first approach is simply a math library C-code math routine available with the digital controller 10 compiler. The advantage of using this function to perform angle decoding during actual servomechanism operation is that it simplifies the overall control software and firmware design. The disadvantage of this approach is that the arctangent function is very complex and therefore produces a great deal of assembler code which in turn uses a great deal of processing time to perform. The result is that that this function does not minimize the Angle Decoder Sample Time given the speed of available digital signal processors.

The second approach uses the same arctangent math routine but employs it prior to servomechanism operation to build a look up table (LUT) that is stored in the digital controller 10 and is considered a part of angle decoder 34. This method has the advantage that it does not have to use the complex assembler code from the arctangent function during operation. In employing the look-up-table, the angles are simply addressed in a direct manner and the Angle Decoder Sample Time is minimized. The disadvantage of this method is that it requires a fair amount of memory depending on how well the designer wants to control the smoothness of speed.

From a design standpoint, the second approach is presently preferred since it minimizes the Angle Decoder Sample Time. It should be noted that the limitation of the first approach would disappear in the future as controllers continue to become faster and more efficient. Therefore, in the future, the direct arctangent method advantages would be realized. However, with the present state-of the-art digital controllers 10 (at least those which would be used to perform motion control) the limitation does exist.

According to the present invention, the cycle counter 36 is used to keep track of the difference between the last two angles that were sampled, then add or subtract 180 degrees based on the magnitude of the difference to produce a cycle count. This approach was found to work the best in coordination with the angle decoder 34 and makes the overall slow-speed operation mode independent from any quadrature square wave signals.

In a working example of a direct drive servo according to the present invention, the servo is used to control a rotational machine. The incremental optical encoder 28 has a resolution of 1024 sine and cosine wave pairs per revolution. The resolution is increased to 262,144 by dividing each of the sine and cosine pairs into 256 increments using a parameter we refer to as the Decoder Gain. This means that for one rotation of the load (assuming direct drive), the feedback count will be 262,144 (1024×256). In order to generate this count, the sine and cosine voltage values are converted into digital signals by the analog-to-digital converter (ADC) 32.

These digital values are then manipulated into address values by a shift and add process that will be discussed in more detail below. The address values are then employed by the Digital Controller 10 to acquire an interpolated angle from the LUT. The LUT is constructed in such a way that the interpolated angles have a range from 0 to 255 due to the fact that the angles are scaled for the Decoder Gain (256 in this case) when the LUT was generated. Therefore, the output of the LUT is a count representing an angle in between one encoder sine and cosine wave pair. The address process and the angle acquisition from the LUT are the main functions that are performed by the angle decoder 34.

To provide as much speed in the calculations as possible, thereby enabling the servo to produce angle samples at a high enough rate to satisfy the Nyquist criteria, a finite 16-bit digital signal processor (DSP) is employed as the digital controller 10. To maximize the speed of the processor, floating point calculations are avoided, and calculations are restricted to 16 bit integer values. Therefore, for parameters that are used in the high-speed calculations, values from 0 to 65535 are possible. Even though we talk about degrees in the generic case, the real system works in counts that are user defined. For example, as noted above, we might assign 256 counts to each sine and cosine cycle. This means that the angle decoder will produce an integer value between 0 and 256 per the LUT. Therefore, in the algorithm described below, we do not add or subtract 360 degrees; rather we add or subtract 256 counts. Similarly, the algorithm uses 128 counts to represent 180 degree. Relative to the accumulated final angle, we add these counts and the accumulated final angle can range from 0 to 65535. Once the count goes higher than 65535, the DSP 10 simply flips over to 0. This means that another separate parameter has to be used to keep track of absolute positions using some higher count parameter such as a double word (32 bits).

At this point the angle count from the LUT is sent to the Cycle Counter 36. The job of the Cycle Counter 36 is to convert the angle count into an accumulated final angle count. It does this by subtracting the previously calculated angle count (obtained during the previous control loop sample period) count from the new angle count. This produces a difference count which is then processed by logic in the cycle counter 36 to determine whether the encoder measurement has moved from one encoder sine and cosine cycle wave pair to an adjacent sine and cosine wave pair. In the most generic sense, the cycle counter adds or subtracts 360 degrees to the angle that is calculated by the angle decoder if the logic detects that the motion of the load has caused the encoder to be measuring in an adjacent sine and cosine pair to the one that was being measured in the previous sample period. The logic performs a fairly simple test as follows:

1. 180 degrees is subtracted from the difference angle and the result is tested to see if it is greater than 0. If the result is greater than 0, then 360 degrees is added to the new measured angle (this basically indicates that we are moving in a defined positive direction) and we move to step 3. If the result is less than or equal to 0 then we move to step 2. 180 degrees is added to the difference angle (not the result produced in step 1 above) and the result is tested to see if it is less than 0. If the sum is less than 0, then 360 degrees are subtracted from the new measured angle (this basically indicates that we are moving in a defined negative direction) and we move to step 3. If the result is greater than or equal to 0, this indicates that the cycle counter has not changed from one sine cosine pair to another and we simply move to step 3.

3. In this step we simply take whatever is the new measured angle and add it to the accumulated final angle.

To relate this accumulated feedback count to the command generator 12 assume that a user turns on the servomechanism and wants to move one revolution from where the load is positioned presently. The command generator would output a command of 262,144 counts and the servo would move until it had a feedback count of 262,144. If the user requires the servo to run in a velocity mode, the command generator 12 simply increments its count by some constant integer counts value every sampling period. The command generator simply puts out counts as a function of time. For example, assuming that the servo loop sample time is 0.001 seconds and it is desired to operate at 1 revolution per second, the command generator 12 would start at 0 and increment up by 256 counts every 0.001 seconds. Thus, starting at time 0 it would put out a count of 0. At time 0.001 seconds it would output a count of 256. At time 0.002 seconds it would output a count of 512, etc.

It was noted above that the digital controller 10 uses integer math so that when the command generator count and the feedback count reach 65535 (for a 16-bit integer math controller), they just roll over mathematically and start over. Two other side issues exist around this point. First, if one wants to perform absolute control one can use the index on the encoder to set a 0 and then move from that point. Second, if one wants to make large movements that exceed the integer math limits then one must employ an auxiliary counter that keeps track of how many times the integer math rolls over.

There are two major differences between the LUT of the present invention and the ones described in the prior art noted above. First, West describes how he must decide whether to use sine/cosine or cosine/sine prior to addressing the LUT. All of this logic is done during operation and is somewhat computationally intensive. The present invention avoids these computations by doing the logic prior to operation thus enabling smoother velocity performance and higher margin over the runaway motor phenomena. Second, the LUT of the present invention is built in a way that it is least sensitive to non-perfect sine and cosine waves. The way this is done is by building a huge table that can accommodate any combination of digital address that is generated by the ADC 32. In other words we take advantage of the fact that memory is cheap. Note that West is concerned about whether the sine and cosine voltage reference levels are biased equally. The present invention is not as sensitive to this problem.

Although memory is relatively inexpensive and it is possible to build a LUT that contains every possible ADC output combination, this is not necessary. For example, assuming that the ADC is a 10 bit ADC, this would require a LUT that had $2^{20}$ LUT or 1,048,576 words of memory. Although this is not out of the question, it turns out that one can use a smaller table that makes the electronics architecture much more efficient. Assume one wants to have a maximum of 14 bits of address ($2^{14}$=16384). To do this, we shift each of the values obtained from the ADC by 3 bits, (which loses precision) and then produce an address of 14 bits. By doing this we lose some precision, but since the table is built with ratios, this tends to wash out and not effect performance to any significant degree. In fact, since the voltage levels of the sine and cosine waves usually do not cover the entire dynamic range of the ADC (for example the ADC may have an input range of 0 to 5 Volts but the sine and cosine signals swing between 2 and 3 Volts), we actually will only use a small portion of the table. In addition, these signals also have distortion and drift, but we have found that good performance can still be obtained even in the face of these error contributions. One aid in reducing these error contributions is to set the Decoder Gain at an optimal level.

The basic idea behind the use of LUT's with these types of servomechanisms is to speed up the ability of taking the sine and cosine signals and producing a corresponding angle from them. If speed were not an issue then the designer would just use some logic and an arctangent function during the actual operation of the servomechanism. This would minimize memory use and avoid some operations that have to be done prior to the main operation. In the case of West, he only takes advantage of the LUT speed in a partial sense. He clearly states in the Interpolation section of his article that he takes the ratio of the sine divided by the cosine or cosine divided by the sine in conjunction with some logic to produce the address that is used to obtain an angle from the LUT. The fact is the division process used to obtain the ratio is quite extensive in terms of computation needs (even using a 68HC16 processor that has a divide function as part of its math library). This and the fact that he performs some logic all in real time are not really efficient. But smooth slow-speed control was not his objective. He only wanted precise high-resolution position control. In our case we digitize the sine and cosine through the ADC and then perform a couple of shift and an add operations (in assembler language) to obtain an address for the LUT. We are able to do this since our LUT has already been built with all of the logic and ratio requirements prior to operation.

The fact is that the shifts and the add are less computationally expensive. In fact, the use of a Digital Signal Processor (DSP) really makes this efficient since the shift operations are a natural part of the architecture of the DSP. Therefore, our angle decoding is really fast which allows us to smooth out the slewing or constant velocity operations even at slow-speeds. Another advantage of this high-speed angle decoding is that the controller of the present invention can be used over a larger speed range since it does not run into a Nyquist sampling problem as early as the prior art controllers do. This also means that the controller does not need to switch over to a quadrature-controlled servomechanism as early in the speed range control. Finally, another advantage is that the controller of the present invention can perform other necessary operations with the DSP while the servomechanism is operating since there is a lot more overhead time. For example, the DSP can use some of the overhead time to be communicating to another controller even during the servomechanism operation. This is important for control of an overall machine since status, data, or some other information can be passed back to this other controller.

The invention has been described in detail with particular reference to certain preferred embodiments thereof, but it will be understood that variations and modifications can be effected within the spirit and scope of the invention.

What is claimed is:

1. A slow-speed servomechanism, comprising:

a) a motor for driving a load;

b) a direct drive transmission between the motor and the load;

c) an incremental optical encoder connected to the load, the encoder having analog sine and cosine outputs;

d) an analog to digital converter for converting the sine and cosine analog values to digital values; and e) a digital controller, connected to the motor and the analog to digital converter, for controlling the motor, the digital controller including i) angle decoder means responsive to the sine and cosine digital values from the analog to digital converter to produce a relative position count indicating a position within one sine and cosine signal pair, ii) cycle counter means responsive to the relative position count for producing an absolute position count within the operating range of the servomechanism by determining which sine cosine pair is being measured, the angle decoder and cycle counter performing at least four angle decodes within each encoder sine and cosine cycle, iii) a command generator responsive to a user defined desired motion of the load to output a desired count, iv) a phase detector responsive to the absolute position count from the cycle counter and the desired count from the command generator to produce an error signal, and iv) a compensation filter responsive to the error signal for generating a motor driving command.

2. The slow-speed servomechanism claimed in claim 1, further comprising a digitizing device connected to the output of the incremental optical encoder for producing a quadrature output and a switch for selectively connecting the absolute position count or the quadrature output to the phase detector for operating the servomechanism in a slow-speed, or medium/high-speed mode, respectively.

3. The slow-speed servomechanism claimed in claim 1 wherein the angle decoder employs a LUT for producing the relative position count, the LUT being addressable by the sine and cosine digital values and containing and angle value for each possible combination of sine and cosine values.

4. The slow-speed servomechanism claimed in claim 1 wherein the cycle counter means produces the absolute position count by keeping track of the difference between the last two angles that were sampled and adding or subtracting a count representing 360 degrees based on the magnitude of the difference.

5. The slow-speed servomechanism claimed in claim 1, wherein the motor is a rotational motor.

6. The slow-speed servomechanism claimed in claim 1, wherein the motor is a linear motor.

7. The slow-speed servomechanism claimed in claim 1, wherein the incremental optical encoder is a rotary optical incremental encoder.

8. The slow-speed servomechanism claimed in claim 1, wherein the incremental optical encoder is a linear optical incremental encoder.

9. The slow-speed servomechanism claimed in claim 4, wherein the cycle counter means performs the following functions to produce the absolute position count, a) subtracting 180 degrees from the difference angle and testing the result to see if it is greater than 0, if the result is greater than 0 then adding 360 degrees to the new measured angle to produce a new measured angle, if the result is less than or equal to 0 then;

b) adding 180 degrees to the difference angle and testing the result to see if it is less than 0, if the sum is less than 0 then subtracting 360 degrees from the new measured angle, if the result is greater than or equal to 0, making no change to the measured angle;

c) adding the new measured angle to the accumulated final angle.

10. A method of operating a slow-speed servo mechanism of the type having a motor for driving a load, a direct drive transmission between the motor and the load, an incremental optical encoder connected to the load, the encoder having analog sine and cosine outputs, an analog to digital converter for converting the sine and cosine analog values to digital values, and a digital controller, connected to the motor and the analog to digital converter, for controlling the motor, comprising the steps of:

a) responsive to the sine and cosine digital values from the analog to digital converter, producing a relative position count indicating a position within one sine and cosine signal pair, b) responsive to the relative position count, producing an absolute position count within the operating range of the servomechanism by determining which sine cosine pair is being measured, the absolute position count being produced at least four times within each encoder sine and cosine cycle, c) generating a command representing a user defined desired motion of the load;

d) detecting the phase between the absolute position count and the command generator to produce an error signal, and e) generating a motor driving command in response to the error signal.

11. The method of operating a slow-speed servo claimed in claim 10, wherein the step of producing an absolute position count, further comprises the steps of:

a) subtracting 180 degrees from the difference angle and testing the result to see if it is greater than 0, if the result is greater than 0 then adding 360 degrees to the new measured angle to produce a new measured angle, if the result is less than or equal to 0 then;

b) adding 180 degrees to the difference angle and testing the result to see if it is less than 0, if the sum is less than 0 then subtracting 360 degrees from the new measured angle, if the result is greater than or equal to 0, making no change to the measured angle; and c) adding the new measured angle to the accumulated final angle.

* * * * *